US012711754B2

(12) United States Patent
Habibian et al.

(10) Patent No.: US 12,711,754 B2
(45) Date of Patent: Aug. 18, 2026

(54) MULTI-VIEW CONVOLUTIONAL NEURAL NETWORKS FOR VIDEO PROCESSING

(71) Applicant: QUALCOMM Incorporated, San Diego, CA (US)

(72) Inventors: Amirhossein Habibian, Amsterdam (NL); Haitam Ben Yahia, Diemen (NL); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/466,415

(22) Filed: Sep. 13, 2023

(65) Prior Publication Data

US 2025/0086956 A1 Mar. 13, 2025

(51) Int. Cl.
*G06V 10/82* (2022.01)
*G06T 5/70* (2024.01)

(52) U.S. Cl.
CPC ................ *G06V 10/82* (2022.01); *G06T 5/70* (2024.01); *G06T 2207/10016* (2013.01)

(58) Field of Classification Search
CPC . G06V 10/82; G06T 5/70; G06T 2207/10016; G06N 3/045; G06N 3/0464; H04N 19/587; H04N 19/86
See application file for complete search history.

(56) References Cited

U.S. PATENT DOCUMENTS 9,330,171 B1 * 5/2016 Shetty ...................... G06N 3/08
9,633,268 B1 * 4/2017 Ma ....................... G06V 10/454
11,151,695 B1 10/2021 Mihal et al.
11,786,201 B1 * 10/2023 Peng .................... A61B 6/4241 378/57
11,922,320 B2 * 3/2024 Jaipuria ................. G06N 3/084
12,464,139 B2 * 11/2025 Minnen ................ H04N 19/119
(Continued)

FOREIGN PATENT DOCUMENTS

WO WO-2022173607 A9 3/2023

OTHER PUBLICATIONS

Chen, H., Jin, Y., Xu, K., Chen, Y. and Zhu, C., 2021. Multiframe-to-multiframe network for video denoising. IEEE Transactions on Multimedia, 24, pp. 2164-2178. (Date of publication May 3, 2021).*
(Continued)

*Primary Examiner* — Xuemei G Chen

(74) *Attorney, Agent, or Firm* — NORTON ROSE FULBRIGHT US LLP

(57) ABSTRACT

The present disclosure relates to processing video data. Some aspects involve partitioning input video data into two or more clips, each clip comprising a number of T frames, wherein each frame comprises a frame height, a frame width and a frame channel dimension $C_{in}$. Each clip is encoded into S encoded representations comprising a code height, a code width, and a code channel dimension, wherein T and S are integers with T≥S>1. Encoding each clip into the S encoded representations may comprise concatenating all T frames of the clip into an input tensor along the frame channel dimension and encoding the input tensor into the S encoded representations using a convolutional neural network (CNN) encoder.

22 Claims, 11 Drawing Sheets

(56) References Cited

U.S. PATENT DOCUMENTS

| | | | | |
|---|---|---|---|---|
| 2011/0182469 | A1* | 7/2011 | Ji | G06V 40/20 382/103 |
| 2020/0036995 | A1* | 1/2020 | Rippel | G06V 20/46 |
| 2020/0097818 | A1* | 3/2020 | Li | G06N 3/0464 |
| 2020/0257902 | A1* | 8/2020 | Yao | G06N 3/08 |
| 2020/0272903 | A1 | 8/2020 | Rippel et al. | |
| 2021/0168395 | A1* | 6/2021 | Cricri | G06N 3/044 |
| 2021/0390289 | A1* | 12/2021 | Yang | G06V 10/806 |
| 2022/0114699 | A1* | 4/2022 | Hsiao | G16H 30/40 |
| 2022/0222914 | A1* | 7/2022 | Pradhan | G06F 18/24133 |
| 2022/0318553 | A1* | 10/2022 | Ben Yahia | G10L 25/57 |
| 2022/0327189 | A1* | 10/2022 | Belli | G06F 21/32 |
| 2023/0005264 | A1* | 1/2023 | Hsiao | G06V 10/82 |
| 2023/0033011 | A1* | 2/2023 | Hsiao | G06N 3/088 |
| 2023/0044969 | A1* | 2/2023 | Yang | G06T 7/194 |
| 2023/0344962 | A1* | 10/2023 | Tran | H04N 7/0127 |
| 2024/0013374 | A1* | 1/2024 | Price | G06T 7/174 |
| 2024/0046503 | A1* | 2/2024 | Chen | G06V 10/774 |
| 2024/0144489 | A1* | 5/2024 | Nguyen | G06T 7/246 |
| 2024/0195985 | A1* | 6/2024 | Minnen | H04N 19/109 |
| 2024/0203434 | A1* | 6/2024 | Fischer | G10L 19/24 |
| 2024/0265507 | A1* | 8/2024 | Yu | G06T 5/60 |
| 2024/0312118 | A1* | 9/2024 | Xu | G06T 15/08 |
| 2024/0331104 | A1* | 10/2024 | Singh | G06T 5/73 |
| 2024/0338831 | A1* | 10/2024 | Park | G06T 7/248 |
| 2025/0252781 | A1* | 8/2025 | Li | G06N 3/045 |
| 2025/0329059 | A1* | 10/2025 | Han | G06N 3/0455 |

OTHER PUBLICATIONS

International Search Report and Written Opinion—PCT/US2024/042089—ISA/EPO1'Dec. 6, 2024.

Lindner L., et al., "Lightweight Video Denoising Using Aggregated Shifted Window Attention", 2023 IEEE/CVF Winter Conference on Applications of Computer Vision (WACV), IEEE, Jan. 2, 2023, pp. 351-360, XP034291040, figure 2, section 4.1.

Ning G., et al., "Autonomous Robotic Ultrasound Vascular Imaging System With Decoupled Control Strategy for External-Vision-Free Environments", IEEE Transactions on Biomedical Engineering, IEEE, USA, vol. 70, No. 11, May 24, 2023, pp. 3166-3177, XP011951555, figure 3, section II.C.

Ye X., et al., "A Unified Model for Continuous Conditional Video Prediction", 2023 IEEE/CVF Conference on Computer Vision and Pattern Recognition Workshops (CVPRW), IEEE, Jun. 17, 2023, pp. 3604-3613, XP034397777, figure 1.

* cited by examiner

MULTI-VIEW CONVOLUTIONAL NEURAL NETWORKS FOR VIDEO PROCESSING

FIELD OF THE DISCLOSURE

The present disclosure generally relates to video processing. For example, aspects of the present disclosure are related to systems and techniques for performing video processing using one or more machine learning systems based on convolutional neural network (CNN) architectures.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing video processing using one or more convolutional neural networks (CNNs).

According to an example, a method for processing video data is provided. The method may comprise: partitioning input video data into two or more clips, each clip comprising a number of T frames, wherein each frame comprises a frame height, a frame width and a frame channel dimension $C_{in}$; encoding each clip into S encoded representations comprising a code height, a code width, and a code channel dimension, wherein T and S are integers with $T \geq S > 1$. Encoding each clip into the S encoded representations may comprise concatenating all T frames of the clip into an input tensor along the frame channel dimension; and encoding the input tensor into the S encoded representations using a convolutional neural network (CNN) encoder.

In another example, an apparatus for processing video data is provided. The apparatus may comprise at least one memory configured to store the video data; and at least one processor coupled to the at least one memory, the at least one processor configured to: partition input video data into two or more clips, each clip comprising a number of T frames, wherein each frame comprises a frame height, a frame width and a frame channel dimension $C_{in}$; and encode each clip into S encoded representations comprising a code height, a code width, and a code channel dimension, wherein T and S are integers with $T \geq S > 1$. Encoding each clip into the S encoded representations may comprise: concatenating all T frames of the clip into an input tensor along the frame channel dimension; and encoding the input tensor into the S encoded representations using a convolutional neural network (CNN) encoder.

In another example, an apparatus for processing video data is provided. The apparatus may comprise means for partitioning input video data into two or more clips, each clip comprising a number of T frames, wherein each frame comprises a frame height, a frame width and a frame channel dimension $C_{in}$; means for encoding each clip into S encoded representations comprising a code height, a code width, and a code channel dimension, wherein T and S are integers with $T \geq S > 1$. The means for encoding each clip into the S encoded representations may comprise: means for concatenating all T frames of the clip into an input tensor along the frame channel dimension; and means for encoding the input tensor into the S encoded representations using a convolutional neural network (CNN) encoder.

Further disclosed are systems, methods, apparatuses, and computer-readable media for training one or more convolutional neural networks (CNNs).

According to an illustrative example, a method for training a convolutional neural network (CNN) for use in processing of input video data that can be partitioned into two or more clips, each clip comprising a number of T frames, wherein each frame comprises a frame height, a frame width and frame channel dimension $C_{in}$ is provided. The CNN model may comprise: a CNN encoder for encoding each clip into S encoded representations, wherein $T \geq S > 1$; and a CNN decoder for decoding each encoded representation of each clip into a decoded frame of output video data. The method may comprise: initializing network parameters of the CNN model; and training the CNN model based on one of supervised learning, unsupervised learning, and semi-supervised learning.

In another example, an apparatus for training a convolutional neural network (CNN) for use in processing of input video data that can be partitioned into two or more clips, each clip comprising a number of T frames, wherein each frame comprises a frame height, a frame width and frame channel dimension $C_{in}$ is provided. The CNN model may comprise: a CNN encoder for encoding each clip into S encoded representations, wherein $T \geq S > 1$; and a CNN decoder for decoding each encoded representation of each clip into a decoded frame of output video data. The apparatus may comprise: at least one memory configured to store the input video data; and at least one processor coupled to the at least one memory, the at least one processor configured to: initialize network parameters of the CNN model; and train the CNN model based on one of supervised learning, unsupervised learning, and semi-supervised learning.

In another example an apparatus for training a convolutional neural network (CNN) for use in processing of input video data that can be partitioned into two or more clips, each clip comprising a number of T frames, wherein each frame comprises a frame height, a frame width and frame channel dimension $C_{in}$ is provided. The CNN model may comprise: a CNN encoder for encoding each clip into S encoded representations, wherein T≥S>1; and a CNN decoder for decoding each encoded representation of each clip into a decoded frame of output video data. The apparatus may comprise: means for initializing network parameters of the CNN model; and means for training the CNN model based on one of supervised learning, unsupervised learning, and semi-supervised learning.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figures 1, 2:
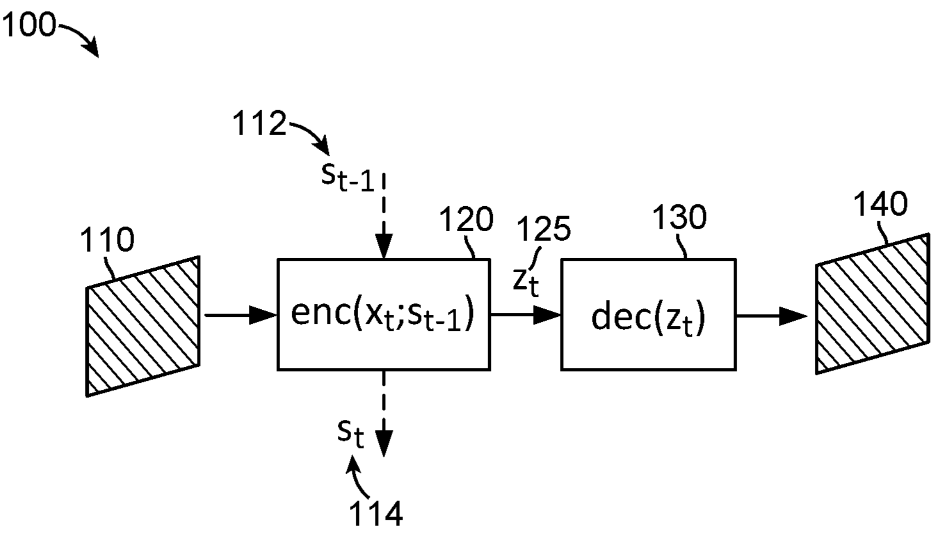
FIG. 1 illustrates a recurrent neural network (RNN) for video processing.
FIG. 2 illustrates a 3D convolutional neural network (CNN) for video processing.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

The demand and consumption of video data has significantly increased in consumer and professional settings. As previously noted, devices and systems are commonly equipped with capabilities for capturing and processing video data. For example, a camera or a computing device including a camera (e.g., a mobile telephone or smartphone including one or more cameras) can capture a video of a scene, a person, an object, etc. The video can be captured and processed and output (and/or stored) for consumption. The video can be further processed for certain effects, such as compression, frame rate up-conversion, sharpening, color space conversion, image enhancement, high dynamic range (HDR), de-noising, low-light compensation, among others. The video can also be further processed for certain applications such as computer vision, extended reality (e.g., augmented reality, virtual reality, and the like), image recognition (e.g., face recognition, object recognition, scene recognition, etc.), and autonomous driving, among others. In some examples, the video can be processed using one or more video artificial intelligence (AI) models, which can include, but are not limited to, AI quality enhancement and AI augmentation models.

Video processing operations can be computationally intensive. In some cases, video processing operations can become increasingly computationally intensive as the resolution of the input frame of video data increases (e.g., as the number of pixels to be processed per input frame of video data increases). For example, a frame of video data with a 4K resolution can include approximately four times as many individual pixels as a frame of video data with a full HD (e.g., 1080p) resolution. In some examples, video processing operations can be performed by processing each pixel individually. In some examples, video processing operations can be performed using one or more machine learning models to derive a mapping from input video data (e.g., raw video data captured by one or more cameras) to a final output video.

For example, one or more machine learning models can be used to derive a mapping between raw video data that includes a color value for each pixel location and a final output video. The final output video can include processed video data derived from the raw video data (e.g., based on the mapping learned by the one or more machine learning models). In some examples, one or more machine learning models can be implemented in a image signal processor (ISP) of a smartphone, camera, or other computing device, and used to process captured frames of video data. For example, one or more machine learning models can be used to perform processing operations for captured frames of video data, such as denoising, deblurring, high dynamic range (HDR) imaging, upscaling (e.g., super resolution), compression, etc. In another example, one or more machine learning models can additionally, or alternatively, be used to perform processing operations such as depth-estimation, semantic segmentation, human pose estimation, etc., using the captured frames of video data as input.

In some examples, the one or more machine learning models can include a neural network trained to perform the video processing task(s). For example, the neural network can be implemented using a convolutional neural network (CNN) architecture including one or more convolutional filters, and/or can be implemented using a recurrent neural network (RNN) architecture using one or more recurrent connections and recurrent states. A video processing neural network can include an input layer, multiple hidden layers, and an output layer. The input layer can include the raw video data from one or more sensors. The hidden layers can include convolutional filters that can be applied to the input data, or to the outputs from previous hidden layers to generate feature maps. The filters of the hidden layers can include weights used to indicate an importance of the nodes of the filters. In some cases, the neural network can have a series of many hidden layers, with early layers determining simple and low-level characteristics of the raw video input data, and later layers building up a hierarchy of more complex and abstract characteristics. The neural network can then generate the final output video (e.g., making up the output layer) based on the determined high-level features.

As mentioned previously, video processing operations performed using a machine learning network can increase in computational complexity as the number of pixels per input video frame increases. In some cases, video processing operations performed using a machine learning network can increase in computational complexity as the number of hidden layers increases, as the number of nodes or activation functions increases, and/or as the number of connections between nodes or layers increases. For example, a node (e.g., neuron) in a neural network can apply an activation function to a group of weighted inputs, and return an output generated by the activation function. An increase in the number of hidden layers or nodes can cause an increase in the computational complexity of a video processing machine learning network, based on a greater number of mathematical operations being performed for each video frame that is processed.

An increase in the number of hidden layers or nodes can also cause an increase in the size of a video processing machine learning network. For example, the activation functions and weights associated with a neural network can each be associated with one or more numerical values (e.g., numerical values used to apply the activation function or weight). As the number of hidden layers or nodes of a machine learning network increases, the number (e.g., quantity) of numerical values that are stored and applied in association with the machine learning network also increases.

As mentioned previously, the operations implemented to perform video processing operations can be computationally intensive and can place a significant burden on the hardware resources of a device. For example, the computational complexity of video processing operations performing using a machine learning network (e.g., neural network) can increase as the resolution of each frame of video data increases. For instance, a frame of 4K video data includes approximately four times as many individual pixels as a frame of full HD video data, and computational complexity of a video processing operation may increase based on being performed for an increased quantity of pixels. In some cases, the size and complexity of a machine learning network used to perform image and video processing operations may also increase as the framerate of an input video data increases. For example, each frame of video data included in a 4K 60 fps video must be processed in half the time available for processing a 4K 30 fps frame, when real-time video processing operations are desired (e.g., 1⁄60s vs. 1⁄30s).

In some examples, one or more image processing machine learning models (e.g., neural networks) can be implemented by a smartphone, mobile computing device, or other edge computing device that includes or is otherwise associated with a camera or other image capture device. In some cases, smartphones or other edge computing devices implementing video processing machine learning models can be limited by a combination of the device's available computation resources and the device's power supply and/or consumption limits. Smartphones or other edge computing devices implementing image processing machine learning models may additionally, or alternatively, be limited based on a maximum permissible inference time (e.g., the amount of time for the machine learning model to generate a processed video output based on a given input of raw video data). For example, to perform real-time augmentation or enhancement operations on video data, in some cases a video processing machine learning model may have a latency target of approximately 20 milliseconds (ms) or less per frame of video data.

In some examples, smartphones and other edge computing devices associated with limited computational resources and power can implement video processing machine learning models by using a model with a reduced size. For example, the size of a video processing machine learning model can be reduced by decreasing the total number of hidden layers, nodes, activation functions, weights, etc., that are applied by the machine learning model in generating a processed output video based on a raw video data input. In some cases, a reduction in model size can impact the accuracy of the processed output video that is generated by the video processing machine learning model.

In some examples, the size and/or computational complexity of a video processing machine learning model (e.g., neural network) can be reduced based on reducing the quantity of recurrent connections and/or removing recurrent connections, such that the hidden state(s) and output(s) associated with a given time step do not depend on the those determined in previous time steps. Reducing or eliminating recurrent connections can be associated with a reduced accuracy of the processed output video frames that are generated by the machine learning model. For example, reducing or eliminating recurrent connections can impact the ability of the machine learning model to utilize temporal information in generating the processed output video frames (e.g., the use of recurrent connections and temporal information can be associated with greater visual quality of the processed output images).

For instance, the use of recurrent connections and/or temporal information in a video processing machine learning model can be used to recover high-frequency details across adjacent (e.g., in time) frames of video data, to achieve temporal consistency in a processed output video generated by the video processing machine learning network, etc. Various recurrent architectures (e.g., RNNs) that include one or more recurrent cells among the feed-forward layers of the network can be used to perform video processing operations to generate processed output videos having a relatively high visual quality. For example, recurrent cells can be implemented using a vanilla-RNN architecture, a Conv-GRU (Gated Recurrent Unit) architecture, a Conv-LSTM (Long Short-Term Memory) architectures, among various others.

There is a continuing need for improving video processing operations, both in terms of quality and speed of processing. Since subsequent video frames oftentimes show similar features, i.e., similar noise, blur, objects, etc., sometimes RNNs are used to use the similarities for the advantage of conserving computational resources and increasing quality and speed of processing. In such RNNs, information flows indirectly across frames via state tensors which may be an output of the neural network processing one frame, and which is then used as an input parameter for the neural network processing the next frame.

However, such RNNs are hard to optimize, which may lead to suboptimal quality of processed video data. Moreover, such RNNs may require a large memory overhead which may increase runtime and energy consumption.

Alternatively, 3D convolutional neural networks (CNNs) are sometimes used, where a whole clip consisting of a fixed number of frames, is encoded into a single representation which is then decoded into the desired number of processed frames. However, decoding the single representation into a plurality of frames is challenging and may also lead to suboptimal results. Furthermore, 3D CNNs generally require far more computational resources than 2D CNNs.

FIG. 1 illustrates a recurrent neural network (RNN) 100 for video processing. According to FIG. 1, a raw video frame 110 may be inputted into encoder network 120. The frame data of the frame t may be represented by $x_t$. Additionally, a state tensor $s_{t-1}$ of the previous frame t−1 may be inputted into encoder network 120. The encoder network may then output state tensor $s_t$ which may be used as an encoder input for the subsequent frame t+1. Additionally, the encoder network may output a representation $z_t$ 125 of frame 110. This representation may then be inputted into decoder network 130, which may further process the representation $z_t$ and output the processed frame 140.

By utilizing state tensors $s_t$, consistency between the processing of individual frames can be ensured. However, such RNNs are hard to optimize, which may lead to suboptimal quality of processed video data. Moreover, such RNNs require a large memory overhead which may increase runtime and energy consumption.

FIG. 2 illustrates a 3D convolutional neural network (CNN) 200 for video processing.

According to FIG. 2, a set of raw video frames 210 1 to T may be inputted into encoder network 220. The frame data of frames 1 to T may be represented by $x_{1:T}$. The encoder network may generate from the raw frame data a representation $z_{1:T}$ 225 of all frames of the set of raw video frames 210. The representation $z_{1:T}$ 225 may then be inputted into decoder network 230, which may then output a processed set of video frames 240. This may ensure that features relevant for a frame are considered by the CNN also for subsequent frames. However, decoding the single representation into a plurality of frames is challenging and may also lead to suboptimal results. Furthermore, 3D CNNs generally require far more computational resources than 2D CNNs.

Thus, the present disclosure provides a video processing neural network which considers features of some frames also in subsequent frames, but which avoids the disadvantages of high complexity, large memory overhead and challenging network training.

Figure 3:
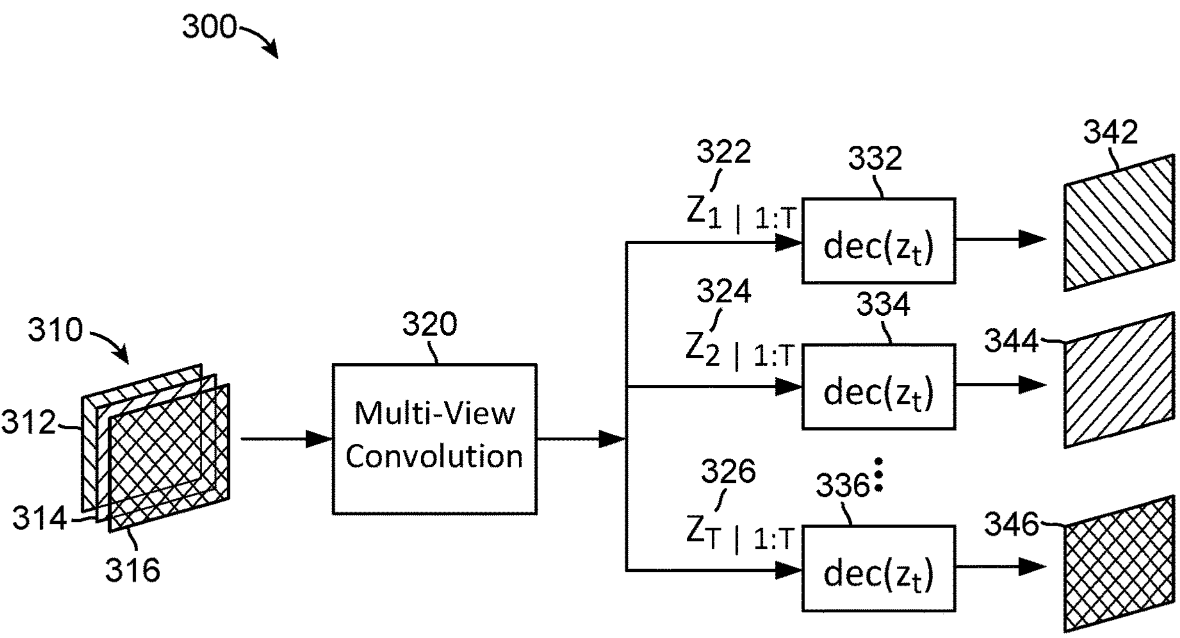
FIG. 3 illustrates a multi-view CNN in accordance with aspects of the present disclosure.

FIG. 3 illustrates a multi-view CNN in accordance with aspects of the present disclosure.

FIG. 3 shows a clip 310 comprising a number of T frames. In the example illustrated in FIG. 3, T equals 3, such that the clip 310 comprises the three frames 312, 314 and 316. However, it is to be understood, that different numbers of frames per clip are also possible, for example 2 frames per clip, 4 frames per clip, 8 frames per clip or 16 frames per clip. Each frame 312, 314 and 316 of clip 310 may comprise a frame height which may correspond to the number of pixels in vertical direction. Each frame 312, 314 and 316 of clip 310 may further comprise a frame width, which may correspond to the number of pixels in horizontal direction. Each frame 312, 314 and 316 may further comprise a frame channel dimension. The frame channel dimension may correspond to color information. For example, the frame channel dimension $C_{in}$ may be equal to one for a black-and-white frame. In other examples, the frame channel dimension may be equal to three in frame with RGB (red, green, blue) color information. In yet another example, the frame channel dimension may be equal to four in a frame with CMYK (Cyan, Magenta, Yellow, Key/Black) color information. Other exemplary frame channel dimensions may also be possible.

According to FIG. 3, clip 310 may be encoded in S representations by means of multi-view convolution network 320. The multi-view convolution network 320 may comprise a convolutional neural network. The number of representations S may be lower than or equal to the number of frames per clip T. In the example illustrated in FIG. 3, the number of representations S is equal to the number of frames per clip, i.e., equal to three. Thus, the frames of the clip may be encoded into a first representation 322, a second representation 324 and a third representation 326.

The encoding of the clip into the S representations may comprise concatenating all T frames of the clip into an input tensor along the frame channel dimension; and encoding the input tensor into the S encoded representations using a convolutional neural network (CNN) encoder.

For example, each frame may have a frame height of 100 pixels, a frame width of 100 pixels and a frame channel dimension of 3. Then, each frame can be described by a Tensor of dimension 100×100×3. Concatenating three of such frames along the frame channel dimension would thus result in a Tensor of dimension 100×100×9.

The concatenation has the benefit that similar feature that may be present within the whole clip, such as blur, noise, or similar, can be easier processed by the CNN if the multiple frames are processed at the same time, i.e., concatenated. This way, a blur or image noise that might be present in all frames can be suppressed more efficiently if all of the concatenated frames show the respective feature. Furthermore, the network can be trained more easily as compared to a recurrent neural network, for example by the training algorithm explained elsewhere herein.

According to FIG. 3, for each representation, an individual decoder network may decode the respective representation. Thus, the first representation 322 may be decoded by decoder network 332, which may result in processed video frame 342. The second representation 324 may be decoded by decoder network 334, which may result in processed video frame 344. The third representation 326 may be decoded by decoder network 336, which may result in processed video frame 346.

Figure 4:
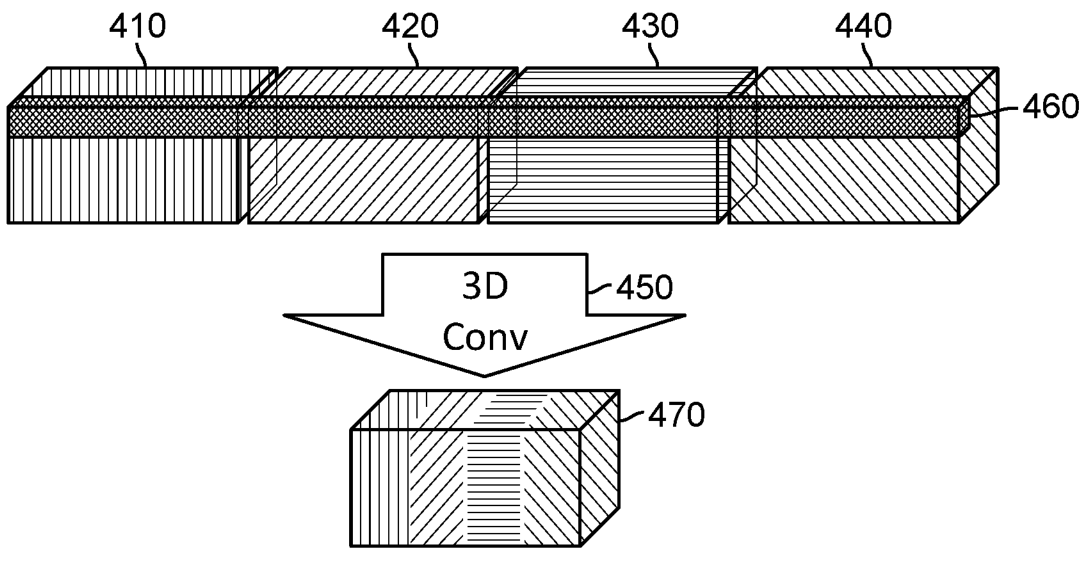
FIG. 4 illustrates the encoding of a set of frames in a 3D CNN as illustrated in FIG. 2.

FIG. 4 illustrates the encoding of a set of frames in a 3D CNN as described in FIG. 2. According to FIG. 4, four frames 410, 420, 430 and 440 may be encoded in 3D CNN 450. The encoding may be done by means of CNN head 460 and result in a single representation 470 which includes features of all four frames 410, 420, 430 and 440.

Figure 5:
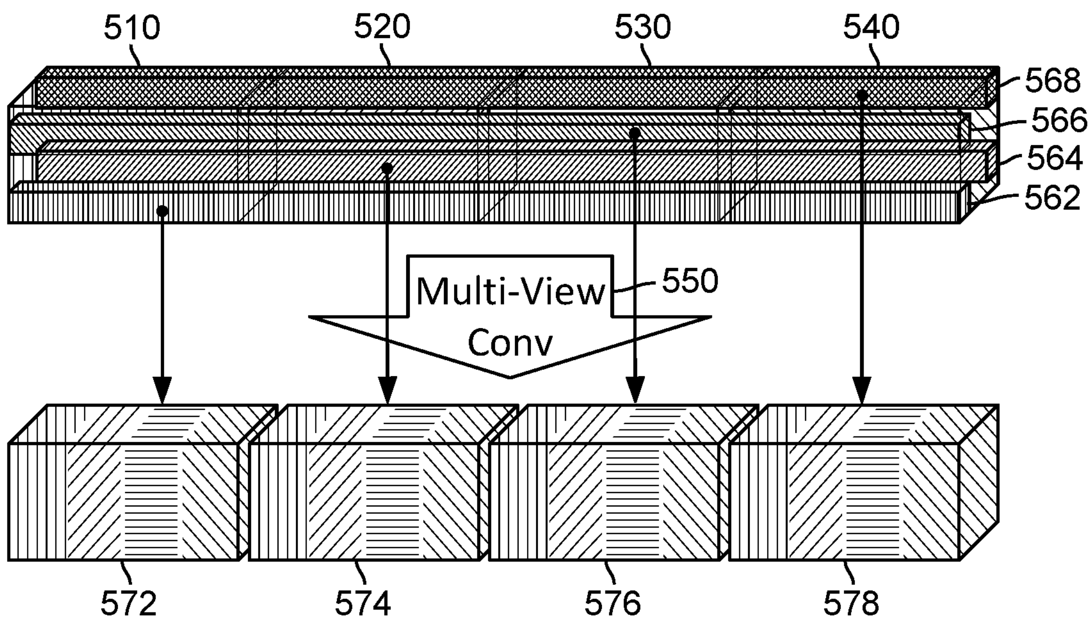
FIG. 5 illustrates the encoding of a set of frames in a multi-view CNN in accordance with aspects of the present disclosure.

In contrast, FIG. 5 illustrates the encoding of a set of frames in a multi-view CNN in accordance with aspects of the present disclosure.

According to FIG. 5, the four frames 510, 520, 530 and 540 may be concatenated prior to encoding them in multi-view CNN 550. The concatenated frames 510, 520, 530 and 540 may then be encoded by means of four separate CNN heads 562, 564, 566 and 568, leading to four representations for the frames. Thus, according to FIG. 5, the concatenated four frames 510, 520, 530 and 540 may be encoded via CNN head 562, leading to a first representation 572 of the concatenated frames. Further, the concatenated four frames 510, 520, 530 and 540 may be encoded via CNN head 564, leading to a first representation 574 of the concatenated frames. Further, the concatenated four frames 510, 520, 530 and 540 may be encoded via CNN head 566, leading to a first representation 576 of the concatenated frames. Further, the concatenated four frames 510, 520, 530 and 540 may be encoded via CNN head 568, leading to a first representation 578 of the concatenated frames.

Each of the representations 572, 574, 576 and 578 may thus include features of all of the concatenated frames 510, 520, 530 and 540. Thus, in contrast to conventional 3D CNN, the multi-view CNN according to the present disclosure does not collapse all frames into a single representation which is then further processed by the decoder network, but instead encodes the frames in multiple representations, for examples in one representation per frame. During further processing, each one of the representations may be further processed separately using a 2D CNN, resulting in the processed frames, as discussed above for example with respect to FIG. 3.

Figure 6:
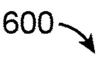
FIG. 6 illustrates a 2D CNN in accordance with aspects of the present disclosure.
Figure 6:
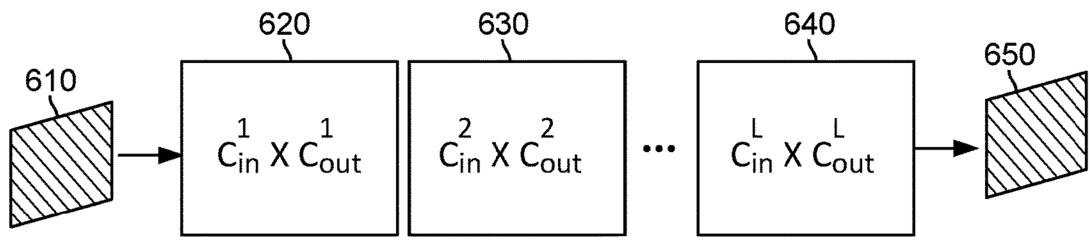

FIG. 6 illustrates a 2D CNN 600 in accordance with aspects of the present disclosure.

According to FIG. 6, a single frame 610 may be processed in a multilayer CNN having L layers, each layer having $C_{in}$ frame channel input dimensions and $C_{out}$ frame channel output dimensions. For example, the frame 610 may be processed in the first layer 620. The first layer may have a number (e.g., quantity) of frame channel input dimensions $$C_{in}^1$$

which may correspond to the frame channel dimensions of frame 610. The first layer 620 may further have a number (e.g., quantity) of frame channel output dimensions $$C_{out}^1.$$

In Some examples, $$C_{in}^1 \text{ and } C_{out}^1$$

may be equal. In some examples, $$C_{in}^1 \text{ and } C_{out}^1$$

may be different.

The output data of the first layer may then be processed in the second layer 630. The channel input dimension of the second layer $$C_{in}^2$$

may correspond to the channel output dimension $$C_{out}^1$$

of the first layer 620. After processing the last layer 640, a processed video frame 650 may be the output of the CNN.

Figure 7:
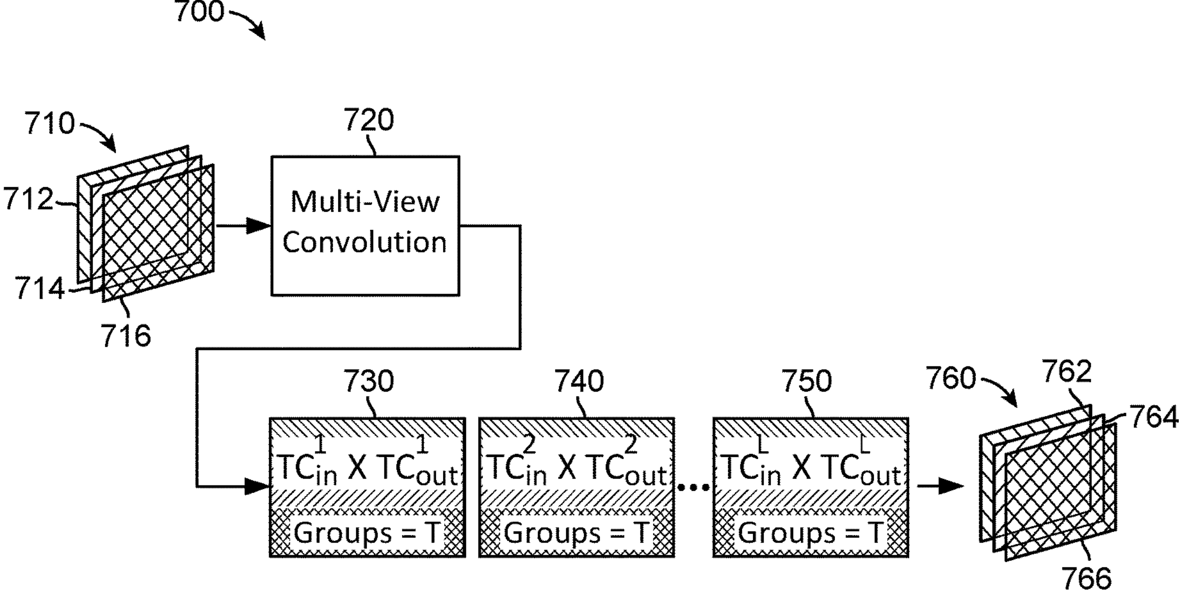
FIG. 7 illustrates a multi-view 2D CNN in accordance with aspects of the present disclosure.

FIG. 7 illustrates a multi-view 2D CNN in accordance with aspects of the present disclosure.

According to FIG. 7, a clip 710 may be utilized as an input for multi-view 2D CNN 700. The clip 700 may comprise a number (e.g., quantity) of T frames. In the example illustrated in FIG. 7, T equals 3, such that the clip 710 comprises the three frames 712, 714 and 716. However, it is to be understood, that different numbers of frames per clip are also possible, for example 2 frames per clip, 4 frames per clip, 8 frames per clip or 16 frames per clip.

The frames 712, 714 and 716 may be concatenated and encoded by multi-view CNN 720 resulting in S representations. In the example illustrated in FIG. 7, S equals T, such that the number of representations after encoding is equal to the number of frames in the encoded clip. However, different architectures are also possible, where T and S differ.

The decoder network may correspond to a multilayer 2D CNN, for example a 2D CNN as described with respect to FIG. 6, with a number (e.g., quantity) of input and/or output channels in the i-th layer of $$T * C_{in}^i \text{ and } T * C_{out}^i,$$

respectively.

In some examples, the parameter "groups" in at least one convolution layer may be set to the number of frames per clip (i.e., to T). Preferably, the parameter "groups" may be set to the number of frames per clip in all convolution layers. This allows for the reduction of the required memory usage without impairing the accuracy of the processing. Further, this provides permutation invariance as regards frame position, i.e., the order of the frames in clip does not change the processing result.

In the example of FIG. 7, where S=T, a separate representation is generated for each one of the input video frames. This may increase the memory footprint of the CNN. Thus, in some examples, the input frames may be partitioned into two or more frame partitions, and the convolution be conducted on each frame partition individually. The final processed video frames may then be obtained by assembling the frames from the individually processed frame partitions. In some examples, each input frames may be partitioned into 64-128 frame partitions. This partitioning allows for the CNN to have the benefits in performance as discussed above, while avoiding the disadvantageous increase in memory usage.

Figure 8:
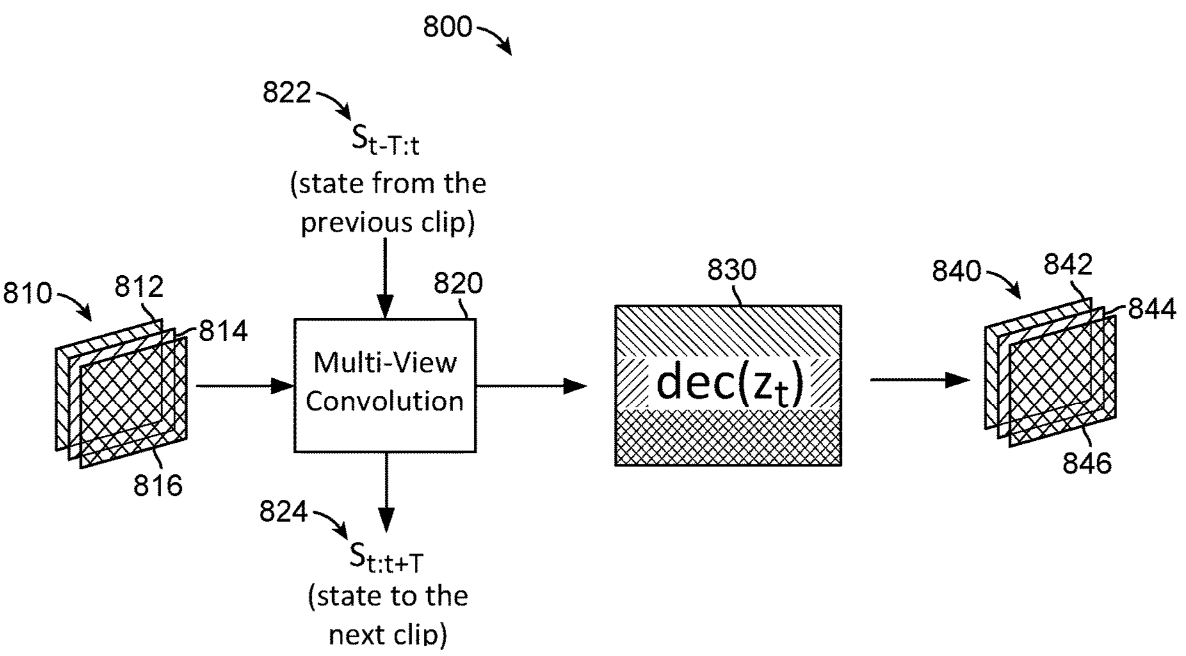
FIG. 8 illustrates an exemplary embodiment in accordance with aspects of the present disclosure.

FIG. 8 illustrates an exemplary embodiment in accordance with aspects of the present disclosure.

According to FIG. 8, CNN 800 may encode clip 810 in a multi-view convolution encoder 820. The clip may comprise a number of T frames 812, 814 and 816. In the example illustrated in FIG. 8, T equals 3, such that the clip 810 comprises the three frames 812, 814 and 816. However, it is to be understood, that different numbers of frames per clip are also possible, for example 2 frames per clip, 4 frames per clip, 8 frames per clip or 16 frames per clip.

In addition to the frames 812, 814 and 816, the multi-view convolution encoder receives as an input a state tensor $S_{t-T:t}$ 822 from a previous clip. This state tensor may contain information about features, like noise, blur, or the like, from the previous clip. In addition to the representations of the frames 812, 812 and 816 generated by the encoder 820, the encoder may further generate a state tensor $S_{t:t+T}$ 824 including features of the currently processed clip, which may then be used as an input when processing the subsequent clip.

The generated representations of the frames 812, 814 and 816 may then be decoded in decoder network 830, resulting in the output of processed clip 840, comprising the processed frames 842, 844 and 846. The decoder network 830 may correspond to a decoder network as described with respect to FIG. 3 or FIG. 7.

The recurrent architecture as described in the exemplary embodiment of FIG. 8 allows for cross-clip connections and thus allows to capture temporal features on timescales beyond the length of a clip. This improves temporal consistency across individual clips, while using fewer computational resources than the expansion of clips would require.

Figure 9:
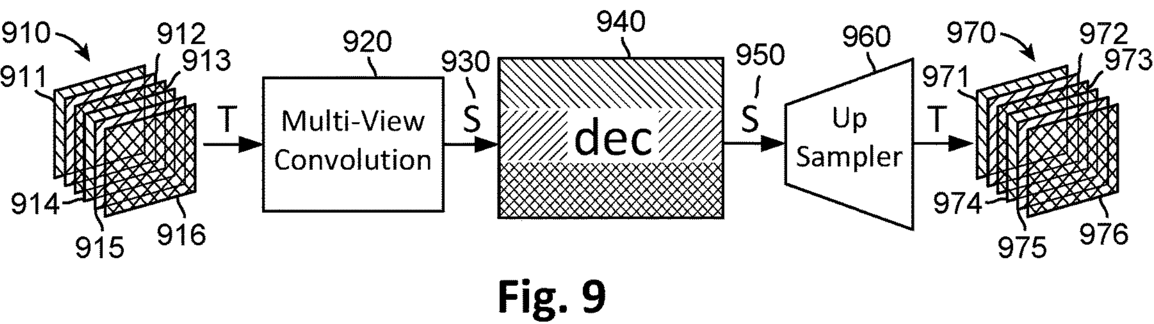
FIG. 9 illustrates another exemplary embodiment in accordance with aspects of the present disclosure.

FIG. 9 illustrates another exemplary embodiment in accordance with aspects of the present disclosure.

According to FIG. 9, a clip 910 may be encoded in a multi-view convolution encoder 920. In the example illustrated in FIG. 9, T equals 6, such that the clip 910 comprises the six frames 911, 912, 913, 914, 915 and 916. However, it is to be understood, that different numbers of frames per clip are also possible, for example 2 frames per clip, 4 frames per clip, 8 frames per clip or 16 frames per clip.

According to FIG. 9, the encoder 920 may generate S representations 930 of the T frames. However, in the example illustrated in FIG. 9, S may be smaller than T (T>S>1). The S representations may then be processed in decoder network 940. The decoder network 940 may correspond to a decoder network as described with respect to FIG. 3 or FIG. 7. Thus, the decoder network may generate S<T processed frames 950 from the T input frames. An up-sampler 960 may then generate additional T-S frames by up-sampling the S processed frames 950 received from the decoder network 940. As an output, the up-sampler 960 may thus generate a total processed clip 970, consisting of T processed frames 971, 972, 973, 974, 975 and 976, i.e., the same number of frames as had been fed into encoder network 920.

Thus, in the example of FIG. 9, instead of generating T representation, i.e., one representation per frame, only S<T representations may be generated by encoder network 920. After processing, the smaller number of frames may be up-sampled by up-sampler 960 to achieve the original number of frames. This exemplary embodiment thus provides a more efficient usage of memory and computational resources, as a neural network of lower complexity suffices to perform the required operations. Also, the computation takes less time than in a CNN with T representations.

Figure 10A:
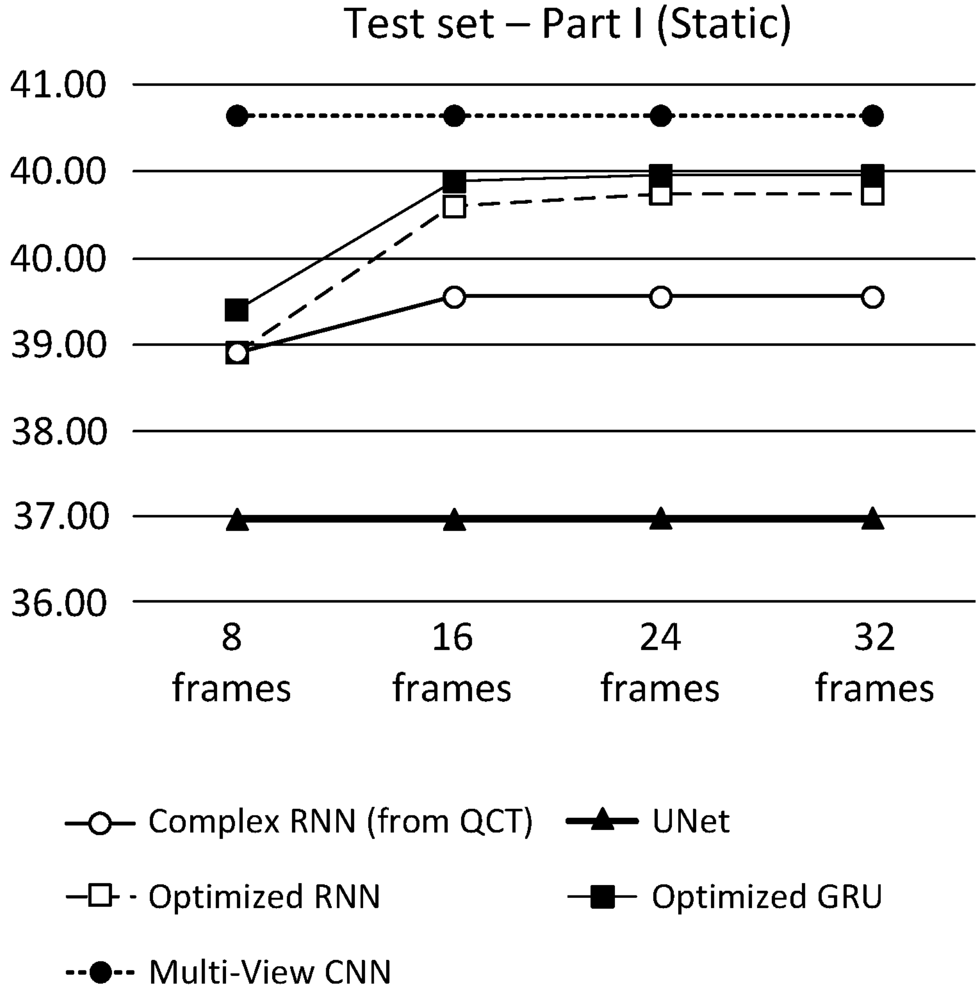
FIG. 10*a* illustrates a graph showing average measurement results of processing in accordance with aspects of the present disclosure.
Figure 10B:
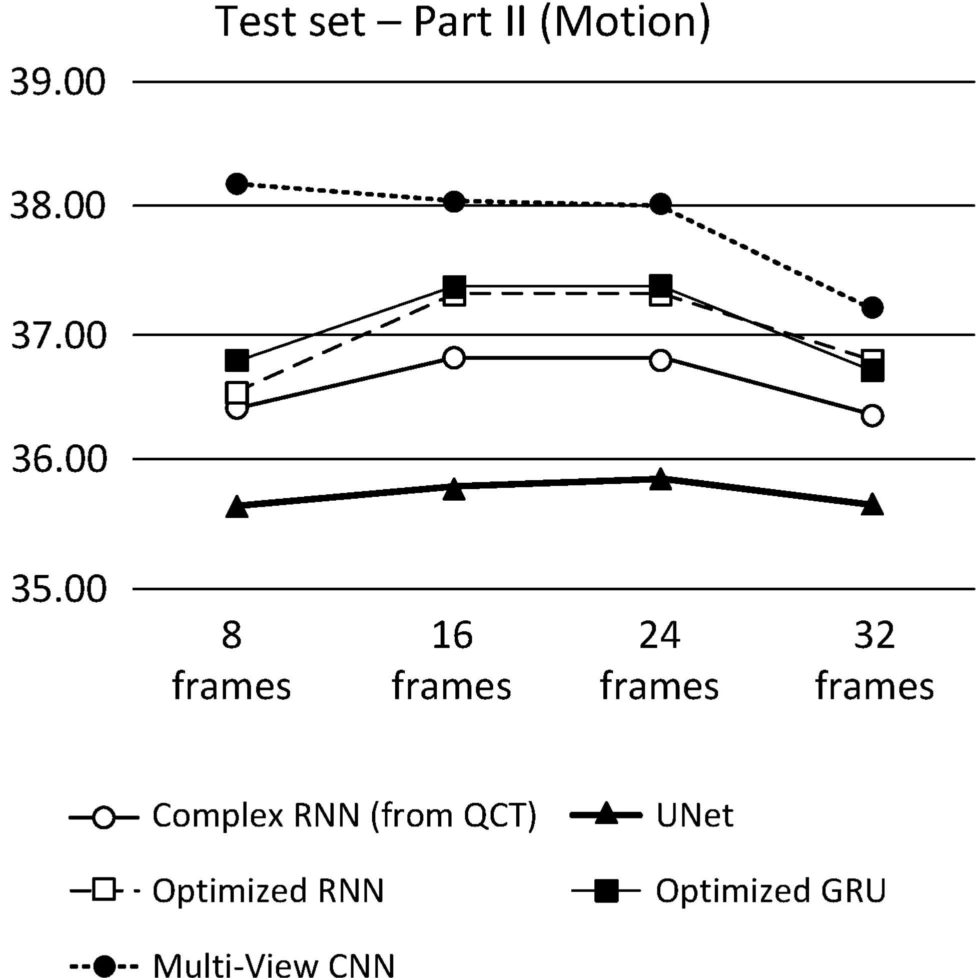
FIG. 10*b* illustrates a graph showing measurement results of static processing in accordance with aspects of the present disclosure.
Figure 10C:
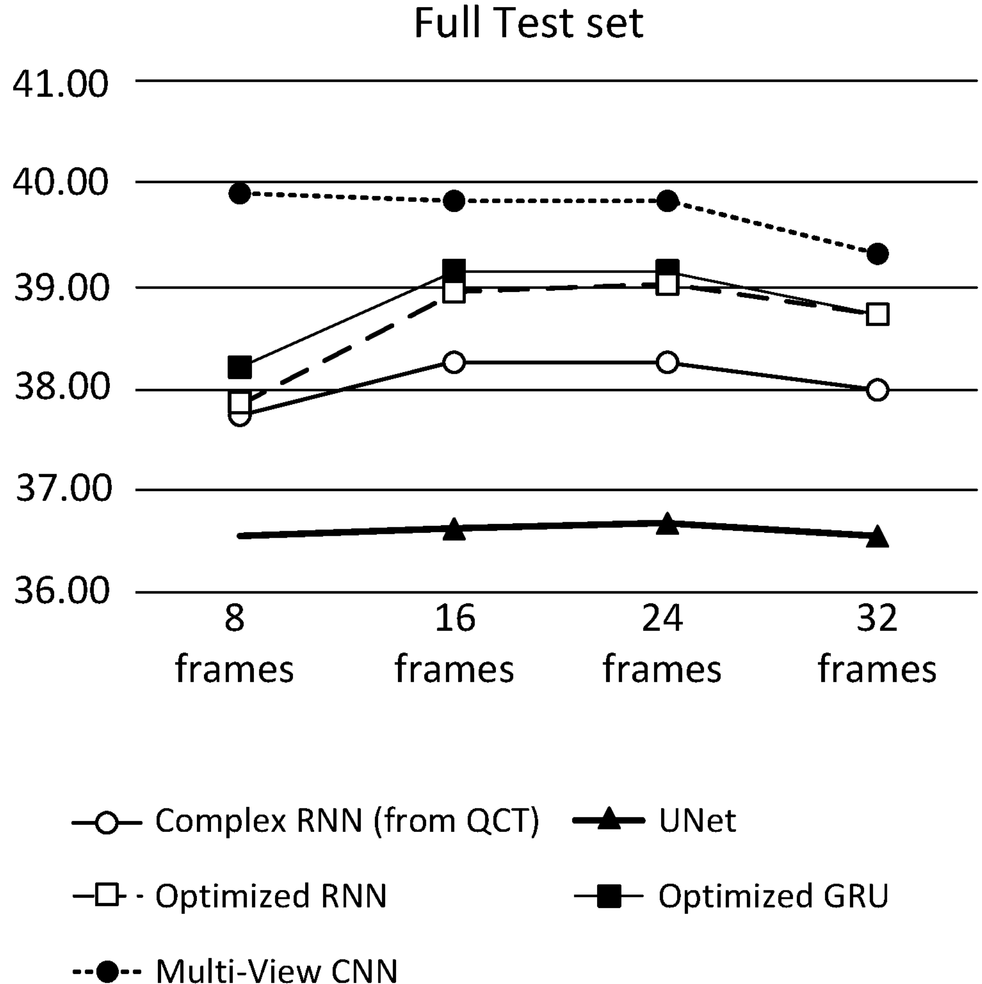
FIG. 10*c* illustrates a graph showing measurement results of motion processing in accordance with aspects of the present disclosure.

FIGS. 10*a* to 10*c* illustrate measurement results from analyzing the performances of several CNNs in video denoising.

For the measurements shown in FIGS. 10*a* to 10*c*, a data set of 414 4K(UHD) videos was pre-treated by applying synthetic noise according to a blind noise model to the video data and feeding the so-prepared video data in a respective CNN for video denoising. The peak signal to noise ratio (PSNR) was analyzed as a quality metric and is plotted on the y-axes of FIGS. 10*a* to 10*c*. To compare the performance of the multi-view convolutional neural network according to aspects of the present disclosure with the performance of conventional convolutional neural networks, several such networks were compared.

Video sequences of different lengths, namely 8 frames, 16 frames, 24 frames and 32 frames have been analyzed. The length of the sequences is plotted on the x-axes of the graphs in FIGS. 10*a* to 10*c*.

For comparison, a highly optimized UNet has been used, as well as a complex recurrent neural network (RNN) based on three UNets connected with long short-term memory (LSTM) cells. Further, an optimized RNN based on a UNet with hardware optimized vanilla RNN cells and an optimized Gated Recurrent Unit (GRU) based on a UNet with hardware optimized GRU cells.

FIG. 10*a* illustrates a graph showing measurement results of static processing in accordance with aspects of the present disclosure.

As can be seen, the (frame-based) UNet shows relatively constant performance, while the complex RNN, optimized RNN and optimized GRU show increased performance with greater sequence length. In the static case, this may be attributed to the recurrency of these architectures.

As can be further seen from the graph, in the static case, the multi-view CNN outperforms all four alternative networks and shows constant quality of performance over sequence length.

Similarly, FIG. 10*b* illustrates a graph showing measurement results of motion processing in accordance with aspects of the present disclosure.

For the motion case, all network architectures show a performance decrease towards greater sequence lengths. However, still, the multi-view CNN outperforms all alternatives.

FIG. 10*c* illustrates a graph showing average measurement results of processing in accordance with aspects of the present disclosure.

Also for the "average" case, i.e., the average between static and motion performance, the multi-view CNN can be seen to outperform all other tested processing networks.

Figure 11:
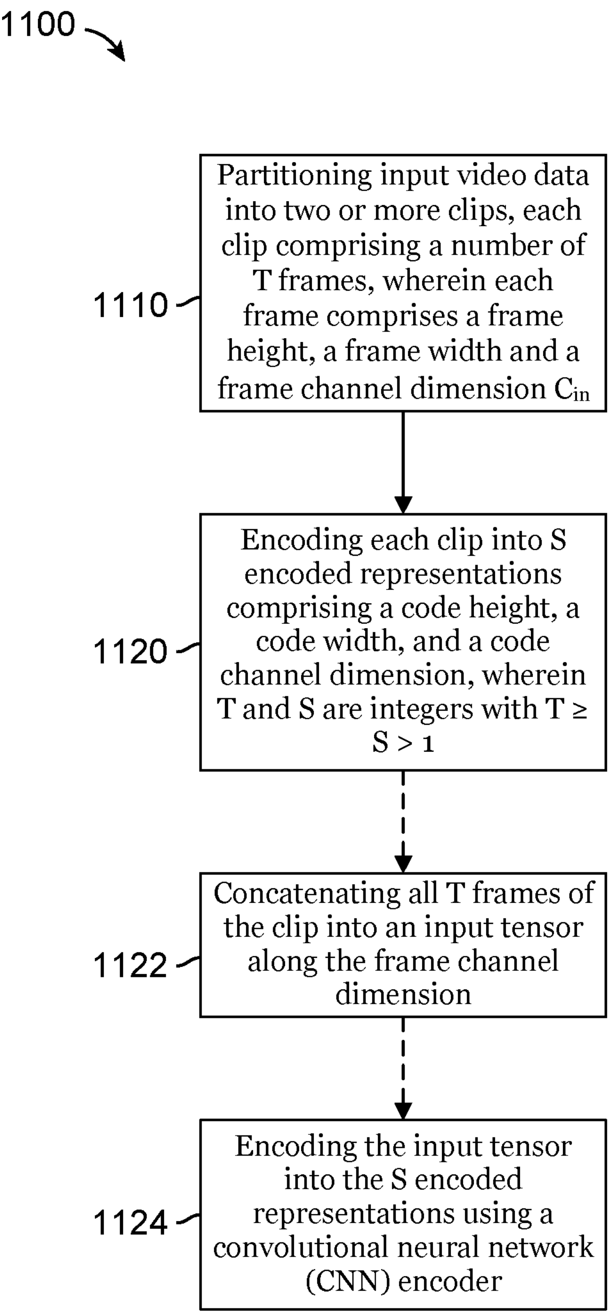
FIG. 11 illustrates a flow diagram of a method for processing video data in accordance with aspects of the present disclosure.

FIG. 11 illustrates a flow diagram of a method for processing video data in accordance with aspects of the present disclosure.

According to FIG. 11, the method 1100 for processing video data may comprise partitioning 1110 input video data into two or more clips, each clip comprising a number of T frames, wherein each frame comprises a frame height, a frame width and a frame channel dimension $C_{in}$.

Partitioning the video data in clips having a number of frames allows for the concurrent processing of multiple frames within a clip. It thus increases the efficiency of the video data processing by the network.

According to FIG. 11, The method 1100 may further comprise encoding 1120 each clip into S encoded representations comprising a code height, a code width, and a code channel dimension, wherein T and S are integers with $T \geq S > 1$.

Encoding each clip into the S encoded representations, wherein S>1 ensures increased efficiency in processing the image, as multiple representations provide for a more efficient decoding, for example by means of multiple decoder networks. In some embodiments, S may be equal to T, i.e., the number of frames in each clip may be equal to the number of encoded representations. This provides for optimal quality of video frame processing.

In other embodiments, S may be smaller than T and greater than 1 ($T > S > 1$). In some aspects, if $S < T$, the CNN decoder may comprise an up-sampling layer using a pixel-shuffle operation, a transposed convolution operation or a similar technique to increase the channel dimension during decoding to T times $C_{in}$.

Such embodiments may provide reduced usage of memory and computational resources because fewer representations are needed. Also, the time of processing may be considerably reduced as compared to the S=T case. While this slightly impairs the quality of video frame processing, as long as S>1, the method is still beneficial in terms of quality as compared to RNNs or CNN with only one representation.

According to FIG. 11, the encoding 1120 may comprise concatenating 1122 all T frames of the clip into an input tensor along the frame channel dimension.

The concatenating allows for the simultaneous processing of multiple frames at once. The simultaneous processing provides for improved processing results because features, such as blur, noise, or similar, that occur in multiple consecutive frames can be recognized and treated by the CNN more efficiently.

According to FIG. 11, the encoding 1120 may further comprise encoding 1124 the input tensor into the S encoded representations using a convolutional neural network (CNN) encoder.

A CNN provides a well-suited and simple method for processing the concatenated video frames.

In some aspects, the CNN encoder may comprise an encoder input layer associated with an input layer encoder convolution kernel comprising an encoder kernel height, an encoder kernel width, an encoder kernel input channel dimension, and an encoder kernel output channel dimension $C_{out}$. The encoder kernel input channel dimension may equal T times $C_{in}$ and the encoder kernel output channel dimension $C_{out}$ may equal S times a positive integer N.

By setting the kernel input channel dimension to T times $C_{in}$, it can be ensured that a sufficient number of neurons is provided for each value of the concatenated input tensor.

In some aspects, the method 1100 may further comprise generating output video data from the encoded clips of the encoded input video data. Generating the output video data may comprise decoding, for each clip, each of the S encoded representations via a CNN decoder to obtain, for each clip, T decoded frames of the output video data. The CNN decoder may comprise a decoder input layer associated with a decoder convolution kernel comprising a decoder kernel height, a decoder kernel width, a decoder kernel input channel dimension, and a decoder kernel output channel dimension. The decoder kernel input channel dimension may equal the code channel dimension.

By setting the decoder kernel input channel dimension to the code channel dimension, it can be ensured that a sufficient number of neurons is provided for each value of the tensors corresponding to the S representations.

In some aspects, the decoder kernel output channel dimension may equal the frame channel input dimension $C_{in}$. This ensures that the processed video frames have the same channel dimension as the raw unprocessed video frames.

In some aspects, partitioning the input video data into the two more clips may comprise partitioning each frame of the input video data into two or more frame partitions, such that each clip of the input video data comprises T frame partitions. Generating the output video data from the encoded representations may comprise assembling the frames of the output video data from the decoded frame partitions of each decoded clip.

This partitioning allows for the CNN to have the benefits in performance as discussed above, while avoiding a disadvantageous increase in memory usage.

In some aspects, method 1100 may further comprise generating, for the first clip, an initial state tensor, forwarding the initial state tensor as input to the CNN for the first clip, and generating an updated state tensor, for the subsequent clip, based on the initial state tensor and the output of the CNN for the first clip.

This recurrent architecture, as has been described in more detail with respect to FIG. 8, allows for cross-clip connections and thus allows to capture temporal features on timescales beyond the length of a clip. This improves temporal consistency across individual clips, while using fewer computational resources than the expansion of clips would require.

Figure 12:
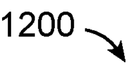
FIG. 12 illustrates a flow diagram of a method for training a CNN in accordance with aspects of the present disclosure.
Figure 12:
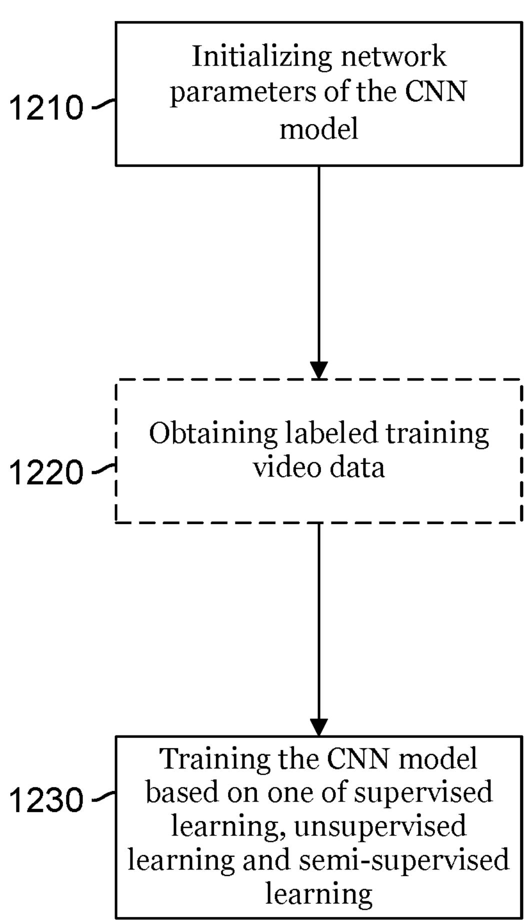

FIG. 12 illustrates a flow diagram of a method for training a CNN in accordance with aspects of the present disclosure.

The CNN may be for use in processing of input video data that can be partitioned into two or more clips, each clip comprising a number of T frames, wherein each frame comprises a frame height, a frame width and frame channel dimension $C_{in}$.

The CNN model may comprise a CNN encoder for encoding each clip into S encoded representations, wherein $T \geq S > 1$; and a CNN decoder for decoding each encoded representation of each clip into a decoded frame of output video data.

Encoding each clip into the S encoded representations, wherein S>1 ensures increased efficiency in processing the image, as multiple representations provide for a more efficient decoding, for example by means of multiple decoder networks. In some embodiments, S may be equal to T, i.e., the number of frames in each clip may be equal to the number of encoded representations. This provides for optimal quality of video frame processing.

In other embodiments, S may be smaller than T and greater than 1 (T>S>1). In some aspects, if S<T, the CNN decoder may comprise an up-sampling layer using a pixel-shuffle operation, a transposed convolution operation or a similar technique to increase the channel dimension during decoding to T times $C_{in}$.

Such embodiments may provide reduced usage of memory and computational resources because fewer representations are needed. Also, the time of processing may be considerably reduced as compared to the S=T case. While this slightly impairs the quality of video frame processing, as long as S>1, the method is still beneficial in terms of quality as compared to RNNs or CNN with only one representation.

According to FIG. 12, the method 1200 for training a CNN may comprise initializing 1210 network parameters of the CNN model and training 1230 the CNN model based on one of: supervised learning, unsupervised learning, semi-supervised learning.

According to FIG. 12, the method 1200 may further comprise obtaining 1220 labeled training video data.

The labeled training data may be used, e.g., for supervised or semi-supervised training of the neural network.

The training may comprise changing at least a subset of the initialized network parameters based on processing the labeled training video data with the initialized CNN model. This provides for an updated CNN which is better capable of processing previously unknown video frames, as discussed with respect to embodiments of the present disclosure.

In some aspects of method 1200, the CNN model may be for use in denoising of video data and the labeled training video data may comprise synthetic noise. Training the CNN model based on the labeled training video data may comprise changing the subset of the initialized network parameters such that the known video noise in the labeled training video data that is processed by the CNN model is suppressed.

In some aspects, method 1200 may further comprise generating the labeled training video data by adding artificially generated video noise to a plurality of video data.

Providing known video data and adding artificial noise, blur, or similar to the data serves for an easy and efficient way for the neural network to learn how to suppress "natural" noise or blur from unprocessed video frames. Thus, a fully automated learning algorithm can be implemented which only requires the input of video data.

Figure 13:
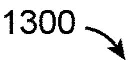
FIG. 13 illustrates an exemplary computing system for implementing neural network based video processing techniques disclosed herein.
Figure 13:
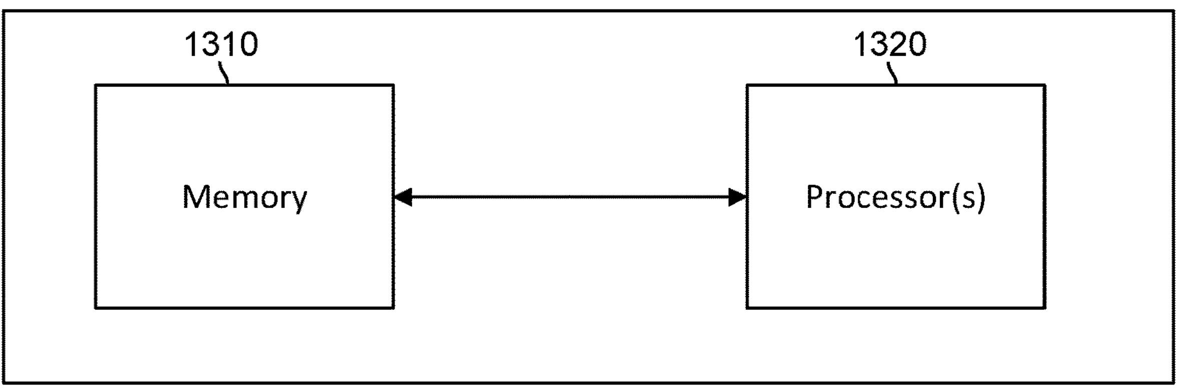

FIG. 13 illustrates an exemplary computing system for implementing neural network-based video processing techniques disclosed herein.

According to FIG. 13, the computing system 1300 may comprise a memory 1310. The memory may comprise data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like.

Computing system 1300 may further comprise one or more processor(s) 1320. The one or more processor(s) may be coupled to memory 1310. The one or more processor(s) 1320 may be configured to carry out methods as described with respect to FIGS. 11 and/or 12. Thus, the computing system 1300 may comprise means for carrying out the methods as described with respect to FIGS. 11 and/or 12.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than and greater than symbols or terminology used herein can be replaced with less than or equal to and greater than or equal to symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Further illustrative aspects of the disclosure include:

Aspect 1. A method for processing video data, comprising: partitioning input video data into two or more clips, each clip comprising a number of T frames, wherein each frame comprises a frame height, a frame width and a frame channel dimension $C_{in}$; encoding each clip into S encoded representations comprising a code height, a code width, and a code channel dimension, wherein T and S are integers with $T \geq S \geq 1$ and wherein encoding each clip into the S encoded representations comprises: concatenating all T frames of the clip into an input tensor along the frame channel dimension; and encoding the input tensor into the S encoded representations using a convolutional neural network (CNN) encoder.

Aspect 2. The method of aspect 1, wherein the CNN encoder comprises an encoder input layer associated with an input layer encoder convolution kernel comprising an encoder kernel height, an encoder kernel width, an encoder kernel input channel dimension, and an encoder kernel output channel dimension $C_{out}$; wherein the encoder kernel input channel dimension equals T times $C_{in}$ and wherein the encoder kernel output channel dimension $C_{out}$ equals S times a positive integer N.

Aspect 3. The method of any one of aspects 1 and 2, further comprising generating output video data from the encoded clips of the encoded input video data, wherein generating the output video data comprises: decoding, for each clip, each of the S encoded representations via a CNN decoder to obtain, for each clip, T decoded frames of the output video data; wherein the CNN decoder comprises a decoder input layer associated with a decoder convolution kernel comprising a decoder kernel height, a decoder kernel width, a decoder kernel input channel dimension, and a decoder kernel output channel dimension; wherein the decoder kernel input channel dimension equals the code channel dimension.

Aspect 4. The method of aspect 3, wherein the decoder kernel output channel dimension equals the frame channel input dimension $C_{in}$.

Aspect 5. The method of any one of aspects 1 to 4, wherein, if S<T, the CNN decoder comprises an upsampling layer using a pixel-shuffle operation, a transposed convolution operation or a similar technique to increase the channel dimension during decoding to T times $C_{in}$.

Aspect 6. The method of any one of aspects 1 to 5, wherein partitioning the input video data into the two more clips comprises partitioning each frame of the input video data into two or more frame partitions, such that each clip of the input video data comprises T frame partitions; and wherein generating the output video data from the encoded representations comprises: assembling the frames of the output video data from the decoded frame partitions of each decoded clip.

Aspect 7. The method of any one of aspects 1 to 6, further comprising: generating, for the first clip, an initial state tensor; forwarding the initial state tensor as input to the CNN for the first clip; and generating an updated state tensor, for the subsequent clip, based on the initial state tensor and the output of the CNN for the first clip.

Aspect 8. A method for training a convolutional neural network (CNN) for use in processing of input video data that can be partitioned into two or more clips, each clip comprising a number of T frames, wherein each frame comprises a frame height, a frame width and frame channel dimension $C_{in}$; wherein the CNN model comprises: a CNN encoder for encoding each clip into S encoded representations, wherein $T \geq S > 1$; and a CNN decoder for decoding each encoded representation of each clip into a decoded frame of output video data; the method comprising: initializing network parameters of the CNN model; obtaining labeled training video data; and training the CNN model based on the labeled training video data, wherein training comprises: changing at least a subset of the initialized network parameters based on processing the labeled training video data with the initialized CNN model.

Aspect 9. The method of aspect 8, wherein the CNN model is for use in denoising of video data and wherein the labeled training video data comprises synthetic noise; and wherein training the CNN model based on the labeled training video data comprises: changing the subset of the initialized network parameters such that the known video noise in the labeled training video data that is processed by the CNN model is suppressed.

Aspect 10. The method of any one of aspects 8 and 9, further comprising generating the labeled training video data by adding artificially generated video noise to a plurality of video data.

Aspect 11. A method for denoising video data, comprising: obtaining the video data; and processing the video with a CNN model trained via the method of any one of aspects 8 to 10.

Aspect 12. An apparatus for processing video data, comprising: at least one memory configured to store the video data; and at least one processor coupled to the at least one memory, the at least one processor configured to: partition input video data into two or more clips, each clip comprising a number of T frames, wherein each frame comprises a frame height, a frame width and a frame channel dimension $C_{in}$; encode each clip into S encoded representations comprising a code height, a code width, and a code channel dimension, wherein T and S are integers with T≥S>1 and wherein encoding each clip into the S encoded representations comprises: concatenating all T frames of the clip into an input tensor along the frame channel dimension; and encoding the input tensor into the S encoded representations using a convolutional neural network (CNN) encoder.

Aspect 13. The apparatus of aspect 12, wherein the CNN encoder comprises an encoder input layer associated with an input layer encoder convolution kernel comprising an encoder kernel height, an encoder kernel width, an encoder kernel input channel dimension, and an encoder kernel output channel dimension $C_{out}$; wherein the encoder kernel input channel dimension equals T times $C_{in}$ and wherein the encoder kernel output channel dimension $C_{out}$ equals S times a positive integer N.

Aspect 14. The apparatus of any one of aspects 12 and 13, the at least one processor further configured to: generate output video data from the encoded clips of the encoded input video data, wherein generating the output video data comprises: decoding, for each clip, each of the S encoded representations via a CNN decoder to obtain, for each clip, T decoded frames of the output video data; wherein the CNN decoder comprises a decoder input layer associated with a decoder convolution kernel comprising a decoder kernel height, a decoder kernel width, a decoder kernel input channel dimension, and a decoder kernel output channel dimension; wherein the decoder kernel input channel dimension equals the code channel dimension.

Aspect 15. The apparatus of aspect 14, wherein the decoder kernel output channel dimension equals the frame channel input dimension $C_{in}$.

Aspect 16. The apparatus of any one of aspects 12 to 15, wherein, if S<T, the CNN decoder comprises an up-sampling layer using a pixel-shuffle operation, a transposed convolution operation or a similar technique to increase the channel dimension during decoding to T times $C_{in}$.

Aspect 17. The apparatus of any one of aspects 12 to 16, wherein partitioning the input video data into the two more clips comprises partitioning each frame of the input video data into two or more frame partitions, such that each clip of the input video data comprises T frame partitions; and wherein generating the output video data from the encoded representations comprises: assembling the frames of the output video data from the decoded frame partitions of each decoded clip.

Aspect 18. The apparatus of any one of aspects 12 to 17, the at least one processor further configured to: generate, for the first clip, an initial state tensor; forward the initial state tensor as input to the CNN for the first clip; and generate an updated state tensor, for the subsequent clip, based on the initial state tensor and the output of the CNN for the first clip.

Aspect 19. An apparatus for training a convolutional neural network (CNN) for use in processing of input video data that can be partitioned into two or more clips, each clip comprising a number of T frames, wherein each frame comprises a frame height, a frame width and frame channel dimension $C_{in}$; wherein the CNN model comprises: a CNN encoder for encoding each clip into S encoded representations, wherein T≥S>1; and a CNN decoder for decoding each encoded representation of each clip into a decoded frame of output video data; the apparatus comprising: at least one memory configured to store the input video data; and at least one processor coupled to the at least one memory, the at least one processor configured to: initialize network parameters of the CNN model; obtain labeled training video data; and train the CNN model based on the labeled training video data, wherein the training comprises: changing at least a subset of the initialized network parameters based on processing the labeled training video data with the initialized CNN model.

Aspect 20. The apparatus of aspect 19, wherein the CNN model is for use in denoising of video data and wherein the labeled training video data comprises synthetic noise; and wherein training the CNN model based on the labeled training video data comprises: changing the subset of the initialized network parameters in such that the known video noise in the labeled training video data that is processed by the CNN model is suppressed.

Aspect 21. The apparatus of any one of aspects 19 and 20, the at least one processor further configured to generate the labeled training video data by adding artificially generated video noise to a plurality of video data.

Aspect 22. An apparatus for denoising video data, comprising: at least one memory configured to store the video data; and at least one processor coupled to the at least one memory, the at least one processor configured to: obtain the video data; and process the video with a CNN model trained via the method of any one of aspects 8 to 10.

Aspect 23. A computer-readable storage medium having computer executable code stored thereon, which when executed by one or more processors, causes the one or more processors to: partition input video data into two or more clips, each clip comprising a number of T frames, wherein each frame comprises a frame height, a frame width and a frame channel dimension $C_{in}$; encode each clip into S encoded representations comprising a code height, a code width, and a code channel dimension, wherein T and S are integers with T≥S>1 and wherein encoding each clip into the S encoded representations comprises: concatenating all T frames of the clip into an input tensor along the frame channel dimension; and encoding the input tensor into the S encoded representations using a convolutional neural network (CNN) encoder.

Aspect 24. The computer-readable storage medium of aspect 23, wherein the CNN encoder comprises an encoder input layer associated with an input layer encoder convolution kernel comprising an encoder kernel height, an encoder kernel width, an encoder kernel input channel dimension, and an encoder kernel output channel dimension $C_{out}$; wherein the encoder kernel input channel dimension equals T times $C_{in}$ and wherein the encoder kernel output channel dimension $C_{out}$ equals S times a positive integer N.

Aspect 25. The computer-readable storage medium of any one of aspects 23 and 24, wherein the computer executable code, when executed by one or more processors, further causes the one or more processors to: generate output video data from the encoded clips of the encoded input video data, wherein generating the output video data comprises: decoding, for each clip, each of the S encoded representations via a CNN decoder to obtain, for each clip, T decoded frames of the output video data; wherein the CNN decoder comprises a decoder input layer associated with a decoder convolution kernel comprising a decoder kernel height, a decoder kernel width, a decoder kernel input channel dimension, and a decoder kernel output channel dimension; wherein the decoder kernel input channel dimension equals the code channel dimension.

Aspect 26. The computer-readable storage medium of aspect 25, wherein the decoder kernel output channel dimension equals the frame channel input dimension Cia.

Aspect 27. The computer-readable storage medium of any one of aspects 23 to 26, wherein, if S<T, the CNN decoder comprises an up-sampling layer using a pixel-shuffle operation, a transposed convolution operation or a similar technique to increase the channel dimension during decoding to T times $C_{in}$.

Aspect 28. The computer-readable storage medium of any one of aspects 23 to 27, wherein partitioning the input video data into the two more clips comprises partitioning each frame of the input video data into two or more frame partitions, such that each clip of the input video data comprises T frame partitions; and wherein generating the output video data from the encoded representations comprises: assembling the frames of the output video data from the decoded frame partitions of each decoded clip.

Aspect 29. The computer-readable storage medium of any one of aspects 23 to 28, wherein the computer executable code, when executed by one or more processors, further causes the one or more processors to: generate, for the first clip, an initial state tensor; forward the initial state tensor as input to the CNN for the first clip; and generate an updated state tensor, for the subsequent clip, based on the initial state tensor and the output of the CNN for the first clip.

Aspect 30. A computer-readable storage medium having stored thereon computer executable code for training a convolutional neural network (CNN) for use in processing of input video data that can be partitioned into two or more clips, each clip comprising a number of T frames, wherein each frame comprises a frame height, a frame width and frame channel dimension $C_{in}$; wherein the CNN model comprises: a CNN encoder for encoding each clip into S encoded representations, wherein T≥S>1; and a CNN decoder for decoding each encoded representation of each clip into a decoded frame of output video data; the computer executable code, when executed by one or more processors, causes the one or more processors to: initialize network parameters of the CNN model; obtain labeled training video data; and train the CNN model based on the labeled training video data, wherein the training comprises: changing at least a subset of the initialized network parameters based on processing the labeled training video data with the initialized CNN model.

Aspect 31. The computer-readable storage medium of aspect 30, wherein the CNN model is for use in denoising of video data and wherein the labeled training video data comprises synthetic noise; and wherein training the CNN model based on the labeled training video data comprises: changing the subset of the initialized network parameters in such that the known video noise in the labeled training video data that is processed by the CNN model is suppressed.

Aspect 32. The computer-readable storage medium of any one of aspects 30 and 31, wherein the computer executable code, when executed by one or more processors, further causes the one or more processors to generate the labeled training video data by adding artificially generated video noise to a plurality of video data.

Aspect 33. A computer-readable storage medium having computer executable code stored thereon, which when executed by one or more processors, causes the one or more processors to: obtain the video data; and process the video with a CNN model trained via the method of any one of aspects 8 to 10.

Aspect 34: An apparatus comprising means for carrying out the method of any one of aspects 1 to 7.

Aspect 34: An apparatus comprising means for carrying out the method of any one of aspects 8 to 10.

Aspect 35: An apparatus comprising means for carrying out the method of aspect 11.

Aspect 36: A computer program comprising instructions which, when the program is executed by a computer, cause the computer to carry out the method of any one of aspects 1 to 7.

Aspect 37: A computer program comprising instructions which, when the program is executed by a computer, cause the computer to carry out the method of any one of aspects 8 to 10.

Aspect 38: A computer program comprising instructions which, when the program is executed by a computer, cause the computer to carry out the method of aspect 11.

The invention claimed is:

1. A method for processing video data, comprising:

partitioning input video data into two or more clips, each clip comprising a number of T frames, wherein each frame comprises a frame height, a frame width and a frame channel input dimension $C_{in}$;

encoding each clip into S encoded representations comprising a code height, a code width, and a code channel dimension, wherein T and S are integers with T≥S>1 and wherein encoding each clip into the S encoded representations comprises:

concatenating all T frames of the clip into an input tensor along the frame channel dimension; and encoding the input tensor into the S encoded representations using a convolutional neural network (CNN) encoder;

wherein the CNN encoder comprises an encoder input layer associated with an input layer encoder convolution kernel comprising an encoder kernel height, an encoder kernel width, an encoder kernel input channel dimension, and an encoder kernel output channel dimension $C_{out}$; and wherein the encoder kernel input channel dimension equals T times $C_{in}$ and wherein the encoder kernel output channel dimension $C_{out}$ equals S times a positive integer N.

2. The method of claim 1, further comprising generating output video data from the encoded clips of the input video data, wherein generating the output video data comprises:

decoding, for each clip, each of the S encoded representations via a CNN decoder to obtain, for each clip, T decoded frames of the output video data;

wherein the CNN decoder comprises a decoder input layer associated with a decoder convolution kernel comprising a decoder kernel height, a decoder kernel width, a decoder kernel input channel dimension, and a decoder kernel output channel dimension; and wherein the decoder kernel input channel dimension equals the code channel dimension.

3. The method of claim 2, wherein the decoder kernel output channel dimension equals the frame channel input dimension $C_{in}$.

4. The method of claim 2, wherein, if $S<T$, the CNN decoder comprises an up-sampling layer using a pixel-shuffle operation, a transposed convolution operation or a similar technique to increase the channel dimension during decoding to T times $C_{in}$.

5. The method of claim 2, wherein partitioning the input video data into the two more clips comprises partitioning each frame of the input video data into two or more frame partitions, such that each clip of the input video data comprises T frame partitions; and wherein generating the output video data from the encoded representations comprises:

assembling frames of the output video data from decoded frame partitions of each decoded clip.

6. The method of claim 1, further comprising:

generating, for a first clip of the two or more clips, an initial state tensor;

forwarding the initial state tensor as input to the CNN for the first clip; and generating an updated state tensor, for the subsequent clip, based on the initial state tensor and an output of the CNN for the first clip.

7. A method for training a convolutional neural network (CNN) model for use in processing of input video data that can be partitioned into two or more clips, each clip comprising a number of T frames, wherein each frame comprises a frame height, a frame width and frame channel dimension $C_{in}$; wherein the CNN model comprises:

a CNN encoder for encoding each clip into S encoded representations, wherein $T\geq S>1$, wherein the CNN encoder comprises an encoder input layer associated with an input layer encoder convolution kernel comprising an encoder kernel height, an encoder kernel width, an encoder kernel input channel dimension, and an encoder kernel output channel dimension $C_{out}$; and wherein the encoder kernel input channel dimension equals T times $C_{in}$ and wherein the encoder kernel output channel dimension $C_{out}$ equals S times a positive integer N; and a CNN decoder for decoding each encoded representation of each clip into a decoded frame of output video data;

the method comprising:

initializing network parameters of the CNN model; and training the CNN model based on one of: supervised learning, unsupervised learning, semi-supervised learning.

8. The method of claim 7, further comprising:

obtaining labeled training video data; and wherein training comprises changing at least a subset of the initialized network parameters based on processing the labeled training video data with the CNN model.

9. The method of claim 8, wherein the CNN model is for use in denoising of video data and wherein the labeled training video data comprises known synthetic noise; and wherein training the CNN model based on the labeled training video data comprises:

changing the subset of the initialized network parameters such that the known synthetic noise in the labeled training video data that is processed by the CNN model is suppressed.

10. A method for denoising video data, comprising:

obtaining the video data; and processing the video data with a CNN model trained via the method of claim 9.

11. An apparatus for processing video data, comprising:

at least one memory configured to store the video data; and at least one processor coupled to the at least one memory, the at least one processor configured to:

partition input video data into two or more clips, each clip comprising a number of T frames, wherein each frame comprises a frame height, a frame width and a frame channel input dimension $C_{in}$;

encode each clip into S encoded representations comprising a code height, a code width, and a code channel dimension, wherein T and S are integers with $T\geq S>1$ and wherein encoding each clip into the S encoded representations comprises:

concatenating all T frames of the clip into an input tensor along the frame channel dimension; and encoding the input tensor into the S encoded representations using a convolutional neural network (CNN) encoder;

wherein the CNN encoder comprises an encoder input layer associated with an input layer encoder convolution kernel comprising an encoder kernel height, an encoder kernel width, an encoder kernel input channel dimension, and an encoder kernel output channel dimension $C_{out}$; and wherein the encoder kernel input channel dimension equals T times $C_{in}$ and wherein the encoder kernel output channel dimension $C_{out}$ equals S times a positive integer N.

12. The apparatus of claim 11, the at least one processor further configured to:

generate output video data from the encoded clips of the input video data, wherein generating the output video data comprises:

decoding, for each clip, each of the S encoded representations via a CNN decoder to obtain, for each clip, T decoded frames of the output video data;

wherein the CNN decoder comprises a decoder input layer associated with a decoder convolution kernel comprising a decoder kernel height, a decoder kernel width, a decoder kernel input channel dimension, and a decoder kernel output channel dimension; and wherein the decoder kernel input channel dimension equals the code channel dimension.

13. The apparatus of claim 12, wherein the decoder kernel output channel dimension equals the frame channel input dimension $C_{in}$.

14. The apparatus of claim 12, wherein, if $S<T$, the CNN decoder comprises an up-sampling layer using a pixel-shuffle operation, a transposed convolution operation or a similar technique to increase the channel dimension during decoding to T times $C_{in}$.

15. The apparatus of claim 12, wherein partitioning the input video data into the two more clips comprises partitioning each frame of the input video data into two or more frame partitions, such that each clip of the input video data comprises T frame partitions; and wherein generating the output video data from the encoded representations comprises:

assembling frames of the output video data from decoded frame partitions of each decoded clip.

16. The apparatus of claim 11, the at least one processor further configured to:

generate, for a first clip of the two or more clips, an initial state tensor;

forward the initial state tensor as input to the CNN for the first clip; and generate an updated state tensor, for the subsequent clip, based on the initial state tensor and an output of the CNN for the first clip.

17. An apparatus for training a convolutional neural network (CNN) model for use in processing of input video data that can be partitioned into two or more clips, each clip comprising a number of T frames, wherein each frame comprises a frame height, a frame width and frame channel dimension $C_{in}$; wherein the CNN model comprises:

a CNN encoder for encoding each clip into S encoded representations, wherein T≥S>1, wherein the CNN encoder comprises an encoder input layer associated with an input layer encoder convolution kernel comprising an encoder kernel height, an encoder kernel width, an encoder kernel input channel dimension, and an encoder kernel output channel dimension $C_{out}$; and wherein the encoder kernel input channel dimension equals T times $C_{in}$ and wherein the encoder kernel output channel dimension $C_{out}$ equals S times a positive integer N; and a CNN decoder for decoding each encoded representation of each clip into a decoded frame of output video data;

the apparatus comprising:

at least one memory configured to store the input video data; and at least one processor coupled to the at least one memory, the at least one processor configured to:

initialize network parameters of the CNN model; and train the CNN model based on one of supervised learning, unsupervised learning, semi-supervised learning.

18. The apparatus of claim 17, wherein the at least one processor is further configured to:

obtain labeled training video data; and wherein the training comprises:

changing at least a subset of the initialized network parameters based on processing the labeled training video data with the CNN model.

19. The apparatus of claim 18, wherein the CNN model is for use in denoising of video data and wherein the labeled training video data comprises known synthetic noise; and wherein training the CNN model based on the labeled training video data comprises:

changing the subset of the initialized network parameters in such that the known synthetic noise in the labeled training video data that is processed by the CNN model is suppressed.

20. An apparatus for denoising video data, comprising:

at least one memory configured to store the video data; and at least one processor coupled to the at least one memory, the at least one processor configured to:

obtain the video data; and process the video with a CNN model trained via the method of claim 8.

21. A non-transitory computer-readable storage medium having computer executable code stored thereon, which when executed by one or more processors, causes the one or more processors to:

partition input video data into two or more clips, each clip comprising a number of T frames, wherein each frame comprises a frame height, a frame width and a frame channel dimension $C_{in}$;

encode each clip into S encoded representations comprising a code height, a code width, and a code channel dimension, wherein T and S are integers with T≥S>1 and wherein encoding each clip into the S encoded representations comprises:

concatenating all T frames of the clip into an input tensor along the frame channel dimension; and encoding the input tensor into the S encoded representations using a convolutional neural network (CNN) encoder, wherein the CNN encoder comprises an encoder input layer associated with an input layer encoder convolution kernel comprising an encoder kernel height, an encoder kernel width, an encoder kernel input channel dimension, and an encoder kernel output channel dimension $C_{out}$; and wherein the encoder kernel input channel dimension equals T times $C_{in}$ and wherein the encoder kernel output channel dimension $C_{out}$ equals S times a positive integer N.

22. A non-transitory computer-readable storage medium having stored thereon computer executable code for training a convolutional neural network (CNN) model for use in processing of input video data that can be partitioned into two or more clips, each clip comprising a number of T frames, wherein each frame comprises a frame height, a frame width and frame channel dimension $C_{in}$; wherein the CNN model comprises:

a CNN encoder for encoding each clip into S encoded representations, wherein T≥S>1, wherein the CNN encoder comprises an encoder input layer associated with an input layer encoder convolution kernel comprising an encoder kernel height, an encoder kernel width, an encoder kernel input channel dimension, and an encoder kernel output channel dimension $C_{out}$; and wherein the encoder kernel input channel dimension equals T times $C_{in}$ and wherein the encoder kernel output channel dimension $C_{out}$ equals S times a positive integer N; and a CNN decoder for decoding each encoded representation of each clip into a decoded frame of output video data;

the computer executable code, when executed by one or more processors, causes the one or more processors to:

initialize network parameters of the CNN model;

obtain labeled training video data; and train the CNN model based on the labeled training video data, wherein the training comprises:

changing at least a subset of the initialized network parameters based on processing the labeled training video data with the CNN model.

* * * * *